(12) United States Patent
Griffin

(10) Patent No.: US 8,662,769 B2
(45) Date of Patent: Mar. 4, 2014

(54) KEYBOARD WITH ROTATABLE PORTION

(75) Inventor: Jason Tyler Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 164 days.

(21) Appl. No.: 12/987,458

(22) Filed: Jan. 10, 2011

(65) Prior Publication Data

US 2012/0177428 A1    Jul. 12, 2012

(51) Int. Cl.
*B41J 5/10*        (2006.01)
*G06F 3/023*       (2006.01)

(52) U.S. Cl.
USPC ............................ 400/489; 400/682; 400/472

(58) Field of Classification Search
USPC .................. 400/472, 489, 680, 682; 361/749
See application file for complete search history.

(56) References Cited

U.S. PATENT DOCUMENTS

| | | | |
|---|---|---|---|
| 5,198,991 A | 3/1993 | Pollitt | |
| 5,267,127 A | 11/1993 | Pollitt | |
| 5,351,066 A | 9/1994 | Rucker et al. | |
| 5,424,728 A | 6/1995 | Goldstein | |
| 5,454,652 A | 10/1995 | Huellemeier et al. | |
| 5,456,542 A | 10/1995 | Welch et al. | |
| 5,463,925 A | 11/1995 | Galocy | |
| 5,543,787 A | 8/1996 | Karidis et al. | |
| 5,574,481 A * | 11/1996 | Lee ................................ | 345/168 |
| 5,596,480 A | 1/1997 | Manser et al. | |
| 5,613,786 A | 3/1997 | Howell et al. | |
| 5,615,081 A | 3/1997 | Ma | |
| 5,651,622 A | 7/1997 | Kim | |
| 5,659,307 A | 8/1997 | Karidis et al. | |
| 5,706,167 A | 1/1998 | Lee | |
| 5,734,548 A | 3/1998 | Park | |
| 5,769,551 A | 6/1998 | Tsai et al. | |
| 5,800,085 A * | 9/1998 | Lee ................................ | 400/489 |
| 5,838,263 A | 11/1998 | Chang | |
| 5,841,635 A | 11/1998 | Sadler et al. | |
| 6,005,497 A | 12/1999 | Snyder ............................ | 341/22 |
| 6,195,839 B1 | 3/2001 | Patterson et al. | |
| 6,262,881 B1 | 7/2001 | Karidis | |

(Continued)

FOREIGN PATENT DOCUMENTS

| | | | | |
|---|---|---|---|---|
| JP | 08 20 2473 A | 8/1996 | ................ | G06F 1/16 |
| WO | WO 98/43157 A1 | 10/1998 | ................ | G06F 3/02 |
| WO | WO 2010/103166 A1 | 9/2010 | .............. | H04M 1/02 |

OTHER PUBLICATIONS

IBM ThinkPad Butterfly keyboard; entry from Wikipedia printed Jan. 10, 2011; http://en.wikipedia.org/wiki/IBM_ThinkPad_Butterfly_keyboard; 2 pages.

(Continued)

*Primary Examiner* — Jill Culler
*Assistant Examiner* — Marissa Ferguson Samreth
(74) *Attorney, Agent, or Firm* — Brinks Gilson & Lione

(57) ABSTRACT

A keyboard may include a base portion, a first keyboard portion, a second keyboard portion, and a connection component that couples the second keyboard portion with the base portion. The connection component allows a movement of the second keyboard portion, relative to the base portion and the first keyboard portion, between a first orientation and a second orientation. In some implementations, the keyboard has a longer length dimension when the second keyboard portion is positioned in the second orientation than when the second keyboard portion is positioned in the first orientation.

8 Claims, 8 Drawing Sheets

(56) References Cited

U.S. PATENT DOCUMENTS

| | | | |
|---|---|---|---|
| 6,392,870 B1* | 5/2002 | Miller, Jr. | 361/679.08 |
| 6,547,463 B1* | 4/2003 | Loo | 400/472 |
| 6,700,774 B2* | 3/2004 | Chien et al. | 361/679.2 |
| 6,734,809 B1* | 5/2004 | Olodort et al. | 341/22 |
| 6,983,175 B2 | 1/2006 | Kwon | |
| 7,035,089 B2 | 4/2006 | Chuang | |
| 7,102,620 B2 | 9/2006 | Harries et al. | |
| 7,109,973 B2 | 9/2006 | Fyke et al. | |
| 7,193,614 B2* | 3/2007 | Bullister | 345/168 |
| 7,221,560 B2 | 5/2007 | Varela | |
| 7,235,738 B2 | 6/2007 | Horinouchi et al. | |
| 7,393,151 B1 | 7/2008 | Miller, Jr. | 400/682 |
| 7,507,044 B2 | 3/2009 | Kemppinen | |
| 2002/0163778 A1 | 11/2002 | Hazzard et al. | 361/683 |
| 2004/0227733 A1 | 11/2004 | Fyke et al. | |
| 2007/0065220 A1 | 3/2007 | Kemppinen | 400/682 |
| 2008/0168624 A1 | 7/2008 | Chien | 16/367 |
| 2008/0194303 A1 | 8/2008 | Takagi et al. | 455/575.3 |
| 2009/0153371 A1 | 6/2009 | Griffin et al. | |
| 2010/0216513 A1 | 8/2010 | Griffin et al. | 455/566 |
| 2010/0232102 A1 | 9/2010 | Walker et al. | |

OTHER PUBLICATIONS

Communication pursuant to Article 94(3) EPC dated Jun. 12, 2013 for European Application No. 11 150 447.8-1960.
Canadian Office Action dated Oct. 28, 2013 for related Canadian Application No. 2,759,672.

* cited by examiner

KEYBOARD WITH ROTATABLE PORTION

BACKGROUND

1. Technical Field

This application relates to keyboards and, more particularly, to a keyboard with a rotatable keyboard portion.

2. Related Art

A keyboard may be used to input information into an electronic device. The keyboard may be a part of the electronic device, such a keyboard of a mobile telephone, personal digital assistant ("PDA"), laptop computer, netbook, or other mobile electronic device. Alternatively, the keyboard may be physically separate from the electronic device, such as a keyboard connected via a wired or wireless connection to a tablet computer device, desktop computer, or mobile electronic device.

In some systems it may be desirable to decrease the size of the electronic device, the associated keyboard, or both. However, as a keyboard decreases in size it may become more difficult to include all the desired key functionality in the smaller keyboard. Additionally, a relatively small keyboard may be less ergonomic or efficient than larger keyboards for some users.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

A keyboard may include a base portion, a first keyboard portion, a second keyboard portion, and a connection component that couples the second keyboard portion with the base portion. The connection component allows a rotational movement of the second keyboard portion, relative to the base portion and the first keyboard portion, between a first orientation and a second orientation. In some implementations, the keyboard has a longer length dimension when the second keyboard portion is positioned in the second orientation than when the second keyboard portion is positioned in the first orientation.

The dimensions and rotational operation of the second keyboard portion may be selected so that the overall length dimension of the keyboard meets various design goals when the second keyboard portion is positioned in either the first orientation or the second orientation. For example, the relatively short length dimension of the keyboard when the second keyboard portion is positioned in the first orientation may be beneficial for device portability, compactness, storage, or may be selected to match a dimension of an associated electronic device, such as a tablet computer or other electronic device. The relatively long length dimension of the keyboard when the second keyboard portion is positioned in the second orientation may be beneficial for ease of keyboard use and for increased space for additional keys. In some implementations, the amount of length added to the keyboard by the rotation of the second keyboard portion into the second orientation may allow for different typing styles that may have been precluded in a keyboard with a smaller length dimension. For example, in some implementations, the relatively longer length resulting from the rotatable keyboard portion may provide enough space for the use of a full two-handed "touch typing" technique instead of the user being limited, based on a small keyboard length, to a "search and peck" typing technique that uses one or two fingers.

Figure 1:
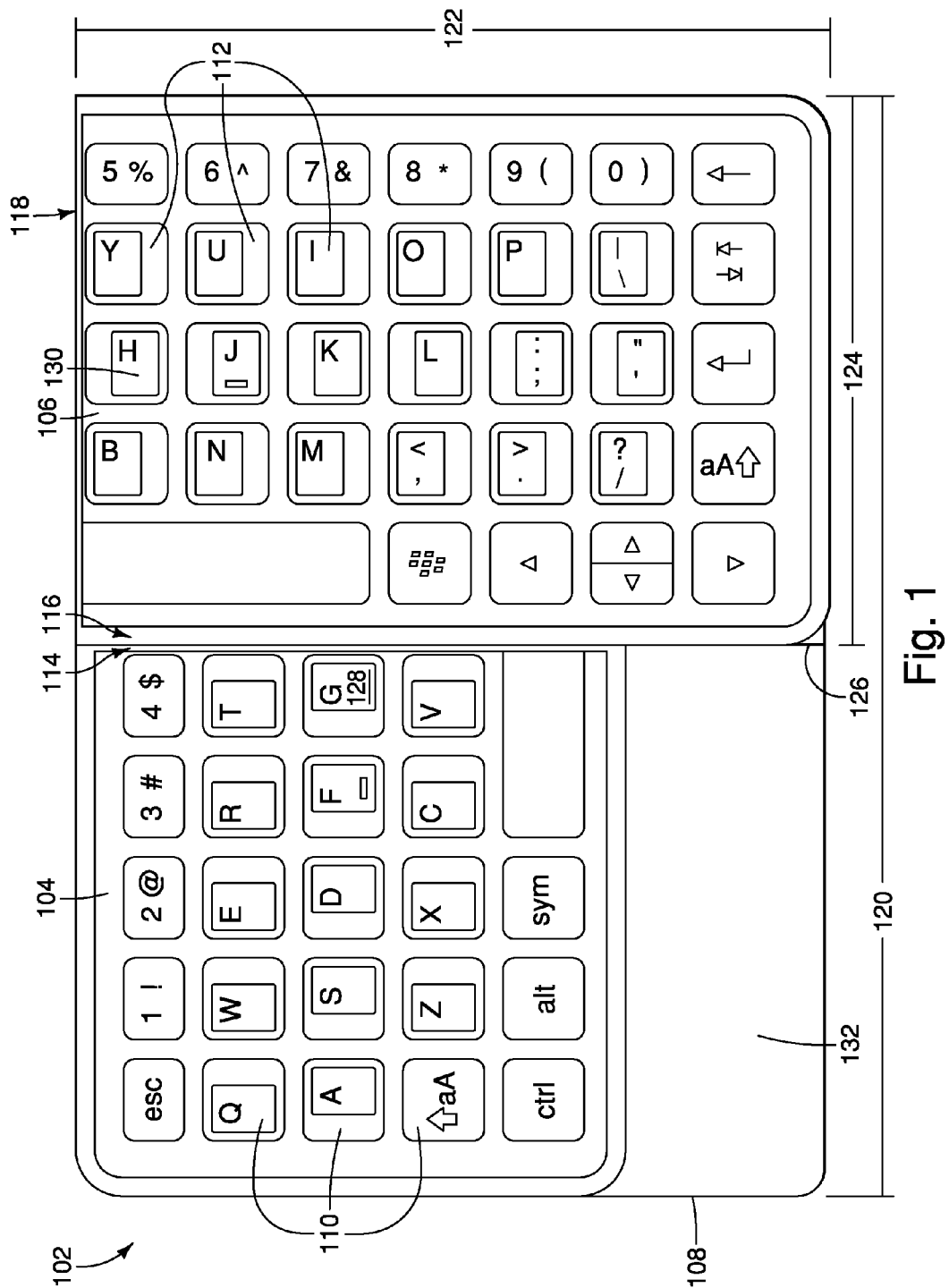
FIG. 1 shows a keyboard with a rotatable portion in a first orientation.

FIG. 1 shows a keyboard 102 with a first keyboard portion 104 and a second keyboard portion 106. The first keyboard portion 104 includes a plurality of keys 110 and the second keyboard portion 106 includes a plurality of keys 112. The keys 110 and 112 may have indicia (e.g., visual or tactile indications) that provide the user with an indication of the functionality available when that key is pressed. The first and second keyboard portions 104 and 106 may be complimentary sections of a single keyboard. For example, the first keyboard portion 104 may comprise a first sub-portion of a "QWERTY" keyboard design, and the second keyboard portion 106 may comprise a second sub-portion of the QWERTY keyboard. In this layout, the keys 110 of the first keyboard portion 104 represent a first sub-portion of the available alphabet and other function keys, and the keys 112 of the second keyboard portion 106 represent a complimentary sub-portion of the available alphabet and other function keys.

Figure 2:
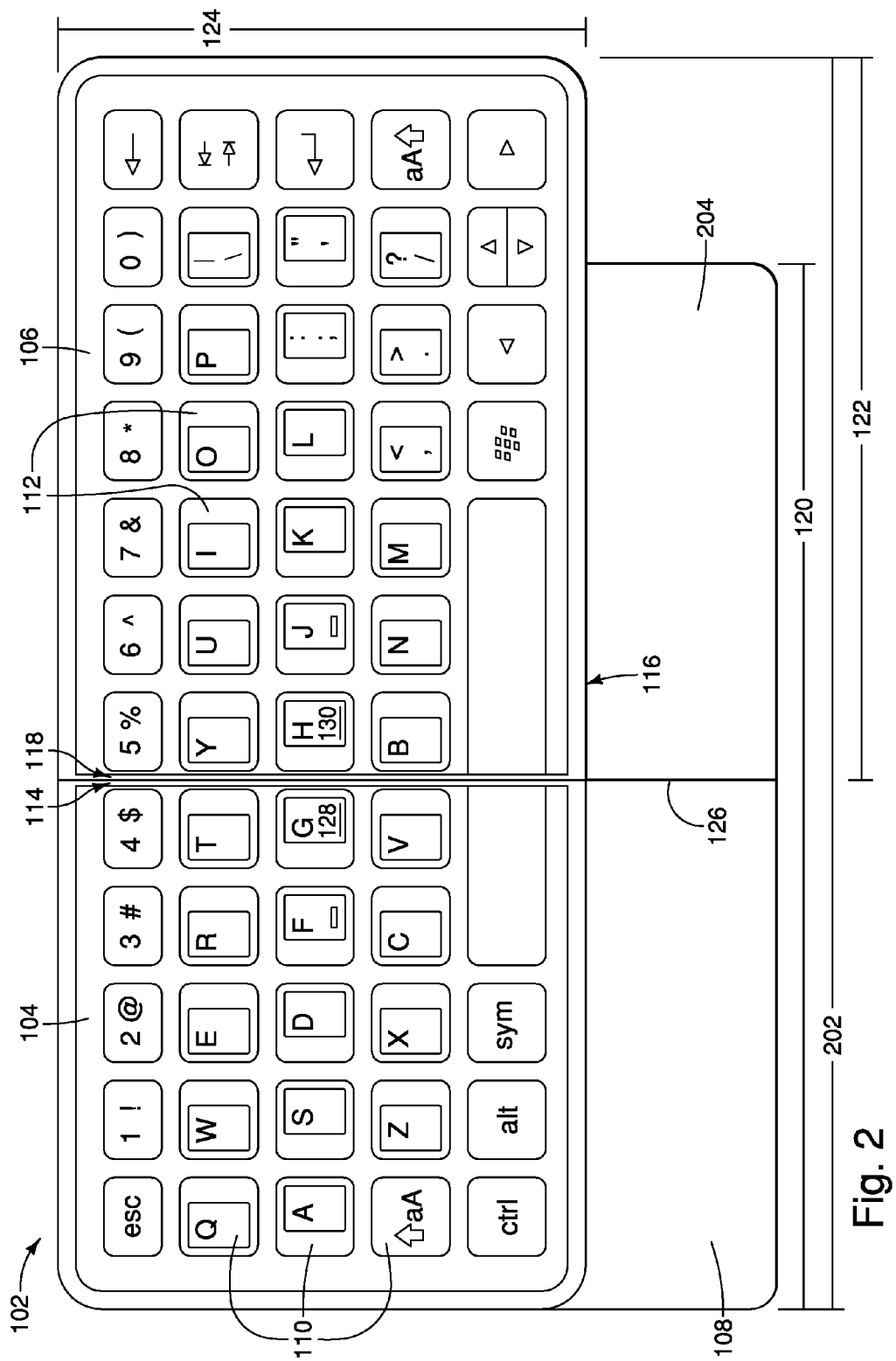
FIG. 2 shows a keyboard with a rotatable portion in a second orientation.

The keyboard 102 may also include a base portion 108. The first keyboard portion 104 may be held in a fixed position and orientation relative to the base portion 108. The second keyboard portion 106 may be rotated, relative to the first keyboard portion 104 and the base portion 108, between multiple orientations. In FIG. 1, the second keyboard portion 106 is shown positioned in a first orientation. In FIG. 2, the second keyboard portion 106 is shown positioned in a second orientation. The base portion 108 may include other sections in addition to the sections visible in FIGS. 1 and 2. For example, the base portion 108 may extend under and support the second keyboard portion 106.

The first and second keyboard portions 104 and 106 may be defined by multiple edges that represent the outer borders of the keyboard portions 104 and 106. The first keyboard portion 104 includes an edge 114, which is shown as a substantially vertical line in FIGS. 1 and 2 at or near the middle of the keyboard 102. The second keyboard portion 106 includes an edge 116 and an edge 118. The edge 116 is shown as a substantially vertical line in FIG. 1 at or near the middle of the keyboard 102 and as a substantially horizontal line in FIG. 2 at or near the bottom of the second keyboard portion 106. The edge 118 is shown as a substantially horizontal line in FIG. 1 at or near the top of the keyboard 102 and as a substantially vertical line in FIG. 2 at or near the middle of the keyboard 102. As shown in FIG. 1, the edge 116 of the second keyboard portion 106 is adjacent to the edge 114 of the first keyboard portion 104 when the second keyboard portion 106 is positioned in the first orientation. The edge 116 may be substantially parallel (e.g., within ten degrees) to the edge 114 when the second keyboard portion 106 is positioned in the first orientation. As shown in FIG. 2, the edge 118 of the second keyboard portion 106 is adjacent to the edge 114 of the first keyboard portion 104 when the second keyboard portion 106 is positioned in the second orientation. The edge 118 may be substantially parallel (e.g., within ten degrees) to the edge 114 when the second keyboard portion 106 is positioned in the second orientation.

In some implementations, the keyboard 102 has a longer overall length dimension when the second keyboard portion 106 is positioned in the second orientation than when the second keyboard portion 106 is positioned in the first orientation. The length dimension may represent a longest dimension of the keyboard 102. In some implementations, the length dimension may represent the horizontal width of the keyboard 102 from the perspective of a typing user. As shown in FIG. 1, the keyboard 102 has a length dimension 120 when the second keyboard portion 106 is positioned in the first orientation. For example, the length dimension 120 is represented by a distance from the edge of the first keyboard portion 104 adjacent to the "A" key to the edge of the second keyboard portion 106 adjacent to the "7" key. As shown in FIG. 2, the keyboard 102 has a length dimension 202 when the second keyboard portion 106 is positioned in the second orientation. For example, the length dimension 202 is represented by a distance from the edge of the first keyboard portion 104 adjacent to the "A" key to the edge of the second keyboard portion 106 adjacent to the "enter/return" key. In the implementation of FIGS. 1 and 2, the length dimension 202 is longer than the length dimension 120.

In some implementations, the keyboard 102 has a longer length dimension when the second keyboard portion 106 is positioned in the second orientation because the second keyboard portion 106 has a longer first dimension 122 than a second dimension 124. When the second keyboard portion 106 is in the first orientation, the shorter second dimension 124 contributes to the overall length dimension of the keyboard 102. When the second keyboard portion 106 is in the second orientation, the longer second dimension 122 contributes to the overall length dimension of the keyboard 102. In the implementation of FIGS. 1 and 2, the length of the edge 116 corresponds to the longer second dimension 122 and the length of the edge 118 corresponds to the shorter dimension 124.

Another feature that may contribute to a longer length dimension when the second keyboard portion 106 is positioned in the second orientation is that the second keyboard portion 106 may have a larger surface area (e.g., it has a larger usable face area for keys) than the first keyboard portion 104. In some implementations, the larger surface area of the second keyboard portion 106 may be used to accommodate a larger number of keys than the first keyboard portion 104. In other implementations, the larger surface area of the second keyboard portion 106 may be used to accommodate the same or a lower number of keys than the first keyboard portion 104 but with keys of a larger size or a wider key spacing.

The keyboard 102 includes a split line 126 defined by the boundary between the first keyboard portion 104 and the second keyboard portion 106. In the implementation of FIG. 1, the split line 126 may represent a physical center line of the keyboard 102 when the second keyboard portion 106 is in the first orientation. After the second keyboard portion 106 transitions from the first orientation of FIG. 1 to the second orientation of FIG. 2, the split line 126 may no longer represent the physical center line of the keyboard 102 due to the asymmetric nature of the second keyboard portion 106. Although the split line 126 may not coincide with the physical center line of the keyboard 102 when the second keyboard portion 106 is in the second orientation, the split line 126 may represent a center line of the home row of the keyboard 102. For example, the split line 126 may serve as a visual cue to a user as to where to place the user's hands on the home row when using a "touch typing" technique. In the implementation of FIGS. 1 and 2, the keyboard 102 uses a QWERTY style key layout with a "G" key 128 and an "H" key 130. The "G" key 128 may be part of the first keyboard portion 104 and the "H" key 130 may be part of the second keyboard portion 106. As shown in FIG. 2, the "H" key 130 is positioned adjacent to the "G" key 128 when the second keyboard portion 106 is positioned in the second orientation. As shown in FIG. 1, the "H" key 130 is not positioned adjacent to the "G" key 128 when the second keyboard portion 106 is positioned in the first orientation. Designing the keyboard 102 so that the split line 126 passes between the "G" key 128 and the "H" key 130 in the home row may provide a visual cue for the user to place the user's hands centered around the split line 126 even though the placement of the user's hands may not be in the physical center of the keyboard 102 when the second keyboard portion 106 is positioned in the second orientation.

In some implementations, the keyboard 102 may include an area 132 of the base portion 108 that is not covered by the keyboard portions 104 and 106. The area 132 may be used for placement of navigation controls (e.g., a trackpad), placement of device electronics, or both. Alternatively, the navigation controls or device electronics may be located in other portions of the base portion 108. For example, the navigation controls or device electronics may be located in an area 204 of the base portion 108 that is covered by the second keyboard portion 106 when the second keyboard portion 106 is positioned in the first orientation but is uncovered when the second keyboard portion 106 moves to the second orientation.

In the implementation of FIGS. 1 and 2, the first keyboard portion 104 is substantially coplanar with the second keyboard portion 106 (e.g., within ten degrees for an angular displacement or within ten percent of a height dimension of the first keyboard portion 104 for a height displacement) when the second keyboard portion 106 is positioned in the first orientation (FIG. 1) and when the second keyboard portion 106 is positioned in the second orientation (FIG. 2). In some implementations, the second keyboard portion 106 also remains in substantially the same plane as the first keyboard portion 104 while the second keyboard portion 106 is being rotated between the first and second orientations. In other implementations, the second keyboard portion 106 may be elevated away from the base portion 108 that supports the second keyboard portion 106 while the second keyboard portion 106 is being rotated between the first and second orientations. This elevation may move the second keyboard portion 106 above the plane of the first keyboard portion 104. For example, the second keyboard portion 106 may be elevated to a height sufficient for the second keyboard portion 106 to clear any obstructions associated with the first keyboard portion 104 that would hinder a rotational movement of the second keyboard portion 106 relative to the first keyboard portion 104.

FIGS. 3-11 illustrate different implementations of rotational movement (e.g., which may include a spatial, translational, or articulating movement) of the second keyboard portion 106 relative to the first keyboard portion 104 and the base portion 108. In some implementations, such as in FIGS. 3-5, the first and second keyboard portions 104 and 106 remain substantially coplanar through the rotation of the second keyboard portion 106. In other implementations, such as in FIGS. 6-8, the second keyboard portion 106 is elevated above the plane of the first keyboard portion 104 but the first and second keyboard portions 104 and 106 remain substantially parallel through the rotation of the second keyboard portion 106. In yet other implementations, such as in FIGS. 9-11, the first and second keyboard portions 104 and 106 do not remain substantially coplanar or substantially parallel while the second keyboard portion 106 is rotated between orientations.

Figure 5:
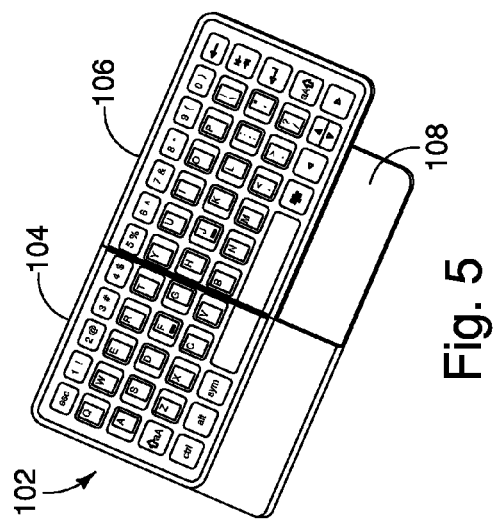
FIG. 5 is yet another view of the keyboard of FIG. 3.
Figure 4:
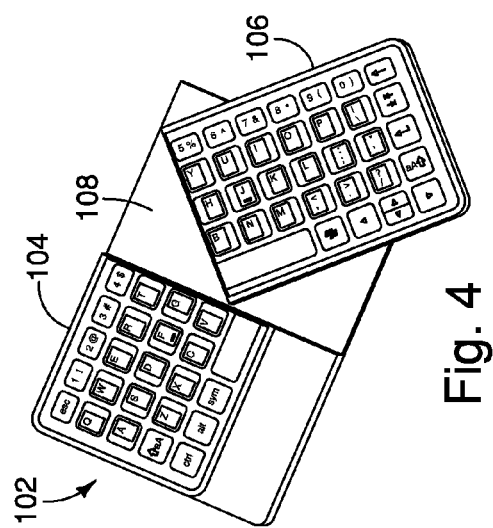
FIG. 4 is another view of the keyboard of FIG. 3.
Figure 3:
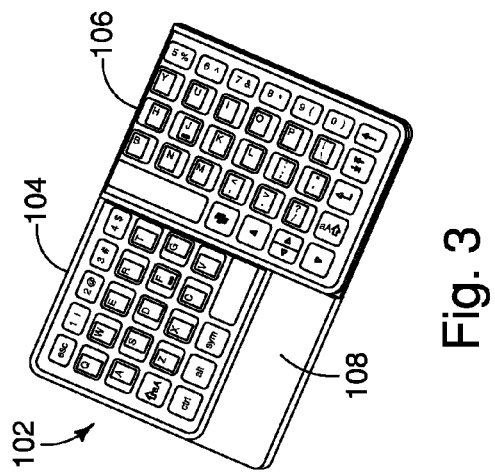
FIG. 3 shows a first implementation of a keyboard with a rotatable portion.
Figure 12:
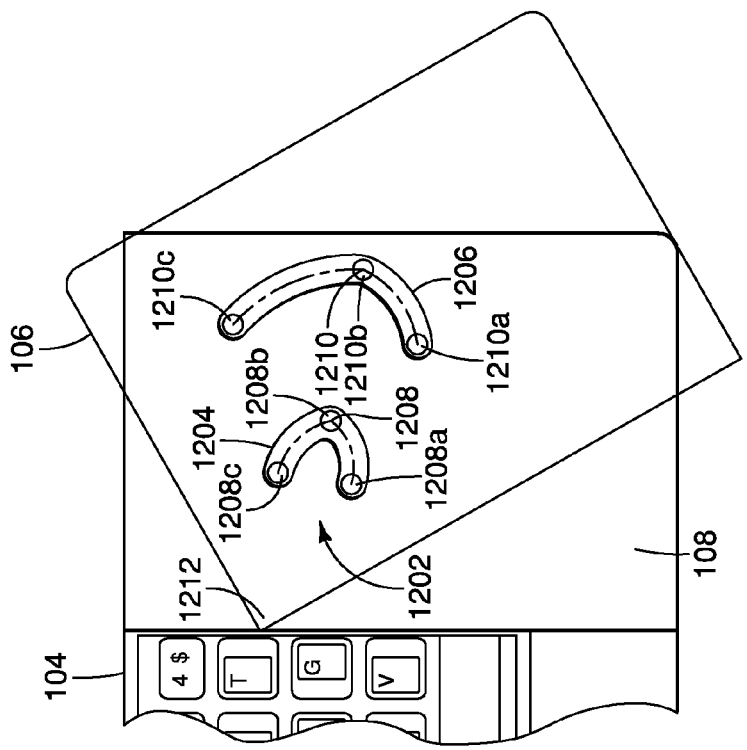
FIG. 12 shows one implementation of a connection component that connects a rotatable portion of a keyboard with a base portion.

In FIGS. 3-5, the second keyboard portion 106 remains in substantially the same plane as the first keyboard portion 104 while a user rotates the second keyboard portion 106 relative to the first keyboard portion 104 and the base portion 108. FIG. 3 shows the keyboard 102 with the second keyboard portion 106 in a first orientation. FIG. 4 illustrates the keyboard 102 with the second keyboard portion 106 moving between the first orientation and a second orientation. FIG. 5 illustrates the keyboard 102 with the second keyboard portion 106 in the second orientation. The keyboard 102 of FIGS. 3-5 includes a connection component that couples the second keyboard portion 106 with the base portion 108 and allows a rotational movement of the second keyboard portion 106, relative to the base portion 108 and the first keyboard portion 104, between the first orientation and the second orientation. The rotational movement of the second keyboard portion 106 in the implementation of FIGS. 3-5 may include a combination of rotation and translation, or rotation around a moving (virtual) pivot axis. One implementation of a connection component that is configured to allow for in-plane rotational movement of the second keyboard portion 106 is shown in FIG. 12 and will be described in further detail below.

Figure 8:
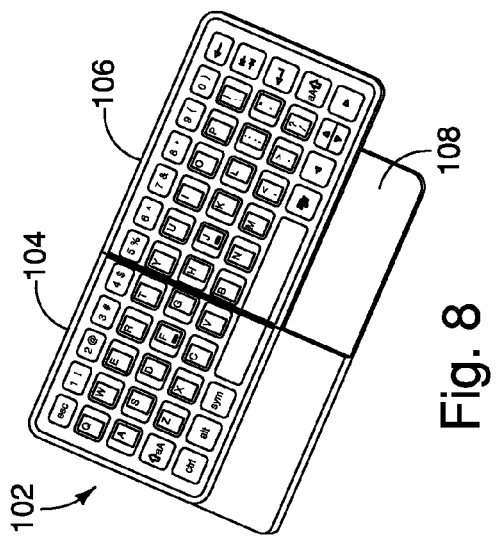
FIG. 8 is yet another view of the keyboard of FIG. 6.
Figure 7:
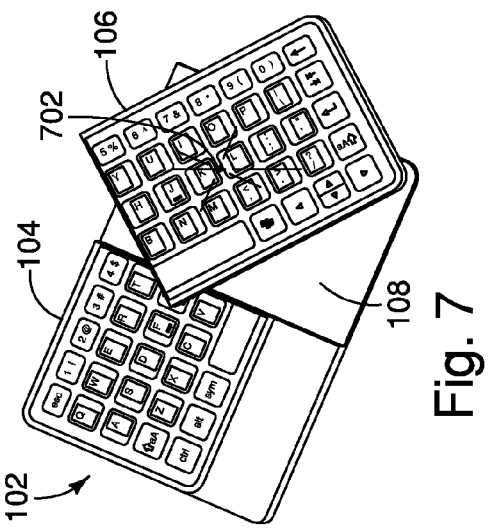
FIG. 7 is another view of the keyboard of FIG. 6.
Figure 6:
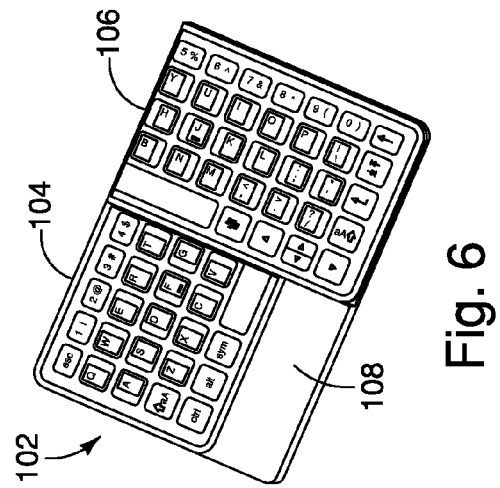
FIG. 6 shows a second implementation of a keyboard with a rotatable portion.

In FIGS. 6-8, the second keyboard portion 106 is elevated above the plane of the first keyboard portion 104 while a user rotates the second keyboard portion 106 relative to the first keyboard portion 104 and the base portion 108. FIG. 6 shows the keyboard 102 with the second keyboard portion 106 in a first orientation. FIG. 7 illustrates the keyboard 102 with the second keyboard portion 106 rotating between the first orientation and a second orientation. In the implementation of FIG. 7, the second keyboard portion 106 rotates about a fixed pivot axis 702. FIG. 8 illustrates the keyboard 102 with the second keyboard portion 106 in the second orientation. The keyboard 102 of FIGS. 6-8 includes a connection component that couples the second keyboard portion 106 with the base portion 108 and allows a rotational movement of the second keyboard portion 106, relative to the base portion 108 and the first keyboard portion 104, between the first orientation and the second orientation. One implementation of a connection component that is configured to elevate the second keyboard portion 106 and allow for rotational movement of the second keyboard portion 106 is shown in FIGS. 13-16 and will be described in further detail below.

Figure 11:
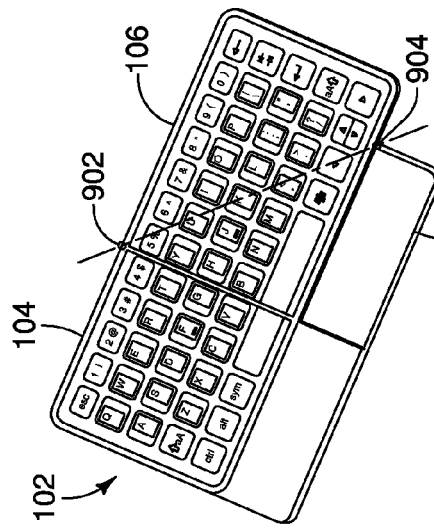
FIG. 11 is yet another view of the keyboard of FIG. 9.
Figure 10:
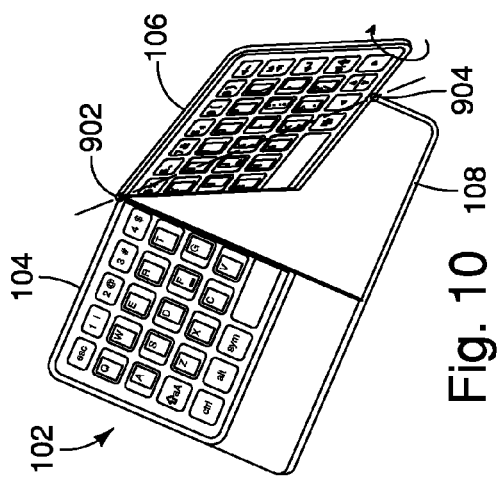
FIG. 10 is another view of the keyboard of FIG. 9.
Figure 9:
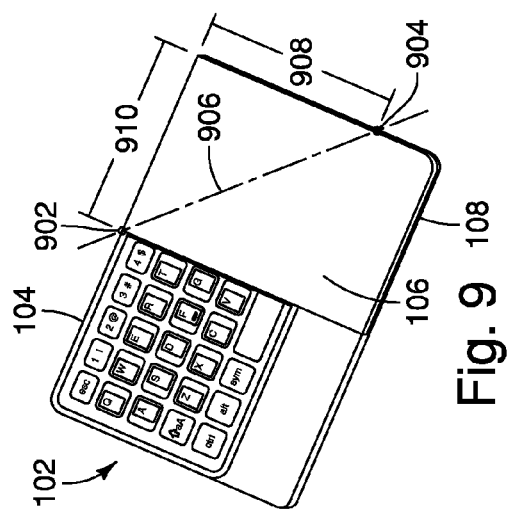
FIG. 9 shows a third implementation of a keyboard with a rotatable portion.

In FIGS. 9-11, the first and second keyboard portions 104 and 106 do not remain substantially coplanar or parallel while a user rotates the second keyboard portion 106 relative to the first keyboard portion 104 and the base portion 108. FIG. 9 shows the keyboard 102 with the second keyboard portion 106 in a first orientation. When the second keyboard portion 106 is positioned in the first orientation, the keys of the second keyboard portion 106 may face an opposite direction than the keys of the first keyboard portion 104. For example, as shown in FIG. 9, the keys of the first keyboard portion 104 may be facing up towards a user and the keys of the second keyboard portion 106 may be facing down away from the user. FIG. 10 illustrates the keyboard 102 with the second keyboard portion 106 rotating between the first orientation and a second orientation. FIG. 11 illustrates the keyboard 102 with the second keyboard portion 106 in the second orientation. When the second keyboard portion 106 is positioned in the second orientation, the keys of the second keyboard portion 106 may face the same direction as the keys of the first keyboard portion 104. For example, as shown in FIG. 11, the keys of the first keyboard portion 104 and the keys of the second keyboard portion 106 are all facing up towards the user.

The keyboard 102 of FIGS. 9-11 includes a connection component that couples the second keyboard portion 106 with the base portion 108 and allows a rotational movement (e.g., which may include a spatial or articulating movement) of the second keyboard portion 106, relative to the base portion 108 and the first keyboard portion 104, between the first orientation and the second orientation. The base portion 108 in FIGS. 9-11 may include a frame that allows for a rotational movement of the second keyboard portion 106. The connection component in FIGS. 9-11 may include a first pivot socket 902 and a second pivot socket 904. The first pivot socket 902 may connect a corner of the second keyboard portion 106 with a corner of the first keyboard portion 104. The second pivot socket 904 may connect another portion of the second keyboard portion 106 with the frame of the base portion 108. The first pivot socket 902 may receive a first ball connector (not shown) of the second keyboard portion 106 and the second pivot socket 904 may receive a second ball connector (not shown) of the second keyboard portion 106. Alternatively, other connection components that allow a flipping rotational movement of the second keyboard portion 106 may be used in place of the ball and socket system of the keyboard implementation shown in FIGS. 9-11.

A user may rotate the second keyboard portion 106 about an axis line 906 that passes through the first pivot socket 902 and the second pivot socket 904 when the second keyboard portion 106 transitions between the first orientation and the second orientation. The connection point between the second keyboard portion 106 and the second pivot socket 904 may be located at a position so that the dimension 908 (corresponding to the distance between the connection point and a first corner of the second keyboard portion 106) is substantially equal (e.g., within ten percent of the dimension 910) to the dimension 910 (corresponding to the distance between the first corner of the second keyboard portion 106 and the corner of the second keyboard portion 106 that is connected with the first pivot socket 902).

FIG. 12 shows an implementation of a connection component 1202 used to connect the second keyboard portion 106 with the base portion 108. In some implementations, the connection component 1202 may be designed to allow for in-plane rotational movement of the second keyboard portion 106 relative to the base portion 108 and the first keyboard portion 104. For example, the connection component 1202 may allow the second keyboard portion 106 to rotate from the first orientation to the second orientation without being blocked by contact from any obstructions of the first keyboard portion 104. The rotational movement of the second keyboard portion 106 in the implementation of FIG. 12 may include a combination of rotation and translation, or rotation around a moving (virtual) pivot axis.

The connection component 1202 may include a first slot 1204 of the base portion 108, a second slot 1206 of the base portion 108, a first protuberance 1208 of the second keyboard portion 106, and a second protuberance 1210 of the second keyboard portion 106. The protuberances 1208 and 1210 may extend out from an under side of the second keyboard portion 106. For example, the protuberances 1208 and 1210 may be pins dimensioned to engage with the slots 1204 and 1206. The slots 1204 and 1206 may be formed into a surface of the base portion 108. The protuberance 1208 may be engaged with the first slot 1204, and the protuberance 1210 may be engaged with the second slot 1206.

The slot 1204 defines a first curved path for the protuberance 1208. The slot 1206 defines a second curved path for the protuberance 1210. The first curved path has a different curvature than the second curved path. For example, the first and second curved paths may be shaped differently to allow the second keyboard portion 106 to rotate (e.g., including a rotational movement, translational movement, or both) from the first orientation to the second orientation. The first and second curved paths may be shaped to allow the second keyboard portion 106 to slide away from the first keyboard portion 104 by a distance that is sufficient to allow a leading corner 1212 of the second keyboard portion 106 to avoid interfering contact with the first keyboard portion 104.

The protuberance 1208 is configured to travel along the first slot 1204 and the protuberance 1210 is configured to travel along the second slot 1206 when the second keyboard portion 106 moves between the first orientation and the second orientation. FIG. 12 illustrates the movement of the protuberances 1208 and 1210 along the slots 1204 and 1206 as the second keyboard portion 106 moves from a first orientation, through an intermediate orientation, to the second orientation. The protuberance 1208 is at location 1208a and the protuberance 1210 is at location 1210a when the second keyboard portion 106 is in the first orientation. When the second keyboard portion 106 is in an intermediate orientation, the protuberance 1208 moves to the location 1208b and the protuberance 1210 moves to the location 1210b. While the protuberance 1208 moves from the location 1208a to the location 1208b, the second keyboard portion 106 slides away from the first keyboard portion 104 to allow the corner 1212 to clear the first keyboard portion 104. The protuberance 1208 moves to the location 1208c and the protuberance 1210 moves to the location 1210c when the second keyboard portion 106 is in the second orientation. While the protuberance 1208 moves from the location 1208b to the location 1208c, the second keyboard portion 106 slides back towards the first keyboard portion 104 to move the edge of the second keyboard portion closer to the edge of the first keyboard portion 104.

FIGS. 13-16 show another implementation of a connection component 1302 used to connect the second keyboard portion 106 with the base portion 108. The connection component 1302 is configured to elevate the second keyboard portion 106 and allow for rotational movement of the second keyboard portion 106 relative to the base portion 108 and the first keyboard portion 104.

Figure 13:
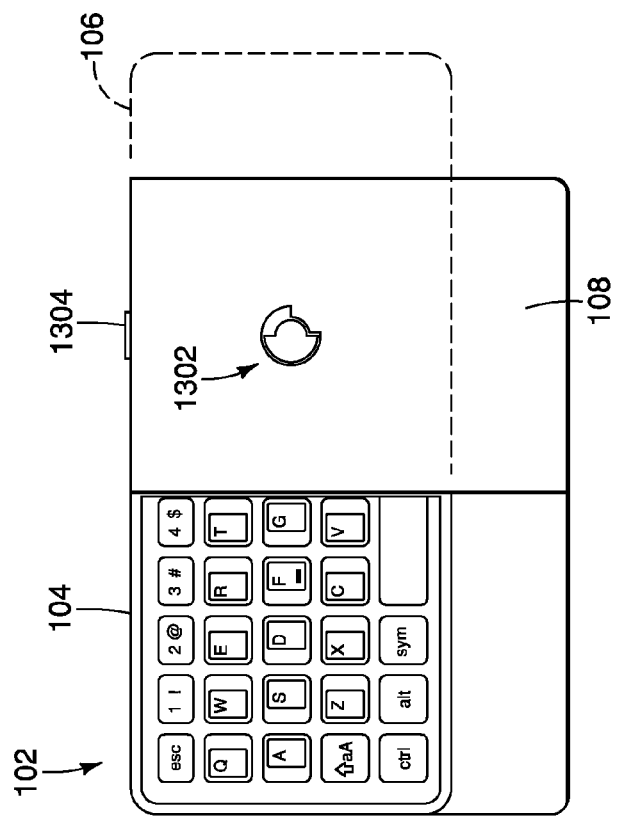
FIG. 13 shows another implementation of a connection component that connects a rotatable portion of a keyboard with a base portion.

As shown in FIG. 13, the keyboard 102 may include a latch 1304 coupled with the base portion 108. The latch 1304 engages with the second keyboard portion 106 to hold the second keyboard portion 106 in either the first orientation or the second orientation. The latch 1304 engages with a different portion of the second keyboard portion 106 when the second keyboard portion 106 is in the first orientation than when the second keyboard portion 106 is in the second orientation. For example, the latch 1304 may engage with one edge of the second keyboard portion 106 (such as the shorter edge of the second keyboard portion 106 in the implementation of FIG. 13) when the second keyboard portion 106 is in the first/closed orientation, and may engage with a different edge of the second keyboard portion 106 (such as the longer edge of the second keyboard portion 106 in the implementation of FIG. 13) when the second keyboard portion 106 is in the second/open orientation. When the second keyboard portion 106 is engaged with the latch 1304, the latch 1304 may hold the second keyboard portion 106 in substantially the same plane as the first keyboard portion 104. When the second keyboard portion 106 is disengaged from the latch 1304, the connection component 1302 may elevate the second keyboard portion 106 above the plane of the first keyboard portion 104.

Figure 14:
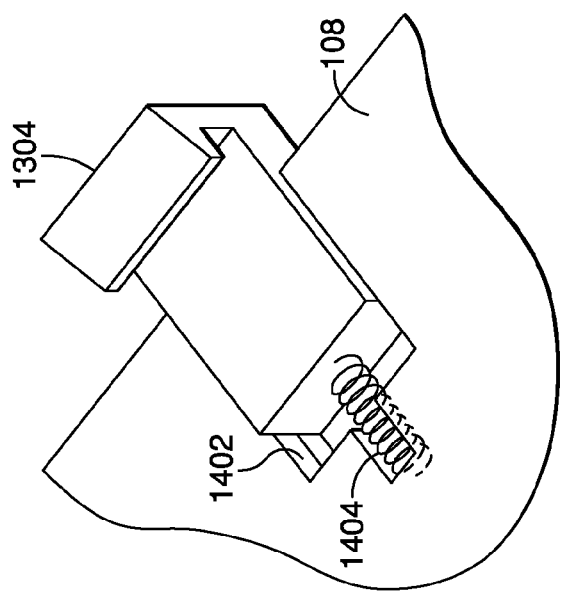
FIG. 14 shows a latch of the implementation of FIG. 13.

FIG. 14 shows the latch 1304 coupled with the base portion 108. The latch 1304 is dimensioned to slide within a slot 1402 defined in the base portion 108. In some implementations, the latch 1304 may work with a spring 1404 that is coupled with the latch 1304 and the base portion 108. In one implementation, the spring 1404 may be an expansion spring that pulls the latch towards the middle of the base portion. A user may pull the latch 1304 away from the base portion 108 resulting in a greater amount of stretch in the spring 1404, which increases the spring load. When the latch is pulled away from the base portion 108 the latch may release the second keyboard portion 106, allowing for rotational movement of the second keyboard portion 106. After the user releases the latch 1304, the spring 1404 may pull the latch 1304 back towards the middle of the base portion 108. If the second keyboard portion 106 is in the first/closed or the second/open orientation, then the bias of the spring 1404 holds the latch 1304 against the second keyboard portion 106 to hold the second keyboard portion 106 in place.

Figure 15:
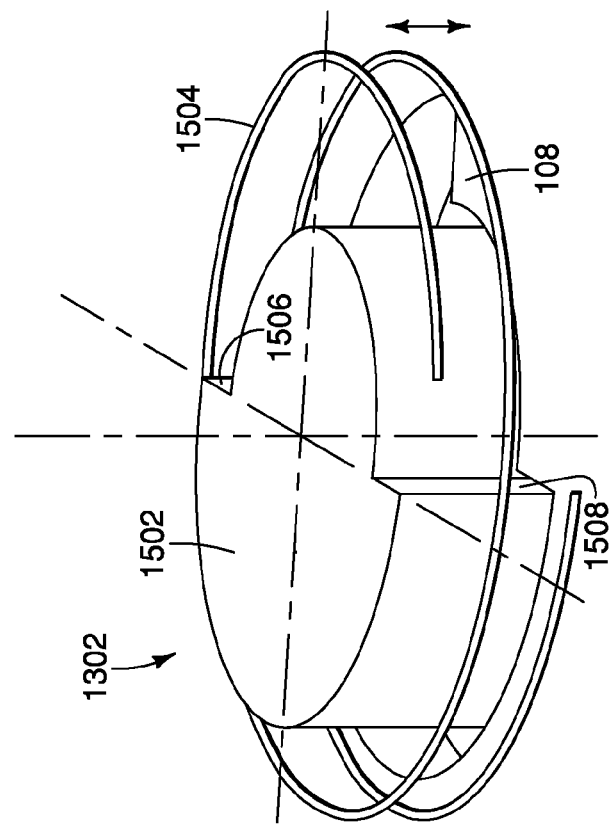
FIG. 15 shows a shaft and a spring of the implementation of FIG. 13.

FIG. 15 shows additional detail of the connection component 1302 used to connect the second keyboard portion 106 with the base portion 108. The connection component 1302 includes a shaft 1502 that connects the second keyboard portion 106 with the base portion 108. The shaft 1502 allows for rotational movement of the second keyboard portion 106. The shaft 1502 also allows the second keyboard portion 106 to move up and down relative to the base portion 108.

The connection component 1302 may include a spring 1504 that works with the shaft 1502 to move the second keyboard portion 106 up and down. The spring 1504 may be a compression spring coupled between the base portion 108 and the second keyboard portion 106. The spring 1504 may be held in a loaded state between the base portion 108 and the second keyboard portion 106 when the latch 1304 is engaged with the second keyboard portion 106. The spring may elevate the second keyboard portion 106 away from the base portion 108 when the latch 1304 is disengaged from the second keyboard portion 106. By elevating the second keyboard portion 106, the second keyboard portion 106 may be able to clear any obstructions of the first keyboard portion 104 when the second keyboard portion 106 rotates from the first/closed orientation to the second/open orientation. When the second keyboard portion 106 is in the desired orientation, the user may push the second keyboard portion 106 down against the bias of the spring 1504. The latch 1304 may then hold the second keyboard portion 106 in the plane of the first keyboard portion 104. To return the second keyboard portion 106 to the other orientation, the user may slide the latch to release the second keyboard portion 106. The spring 1504 may then elevate the second keyboard portion 106 allowing the user to rotate the keyboard portion back to the other orientation. The user may then push the second keyboard portion 106 down again so that the latch 1304 grabs the second keyboard portion 106 and holds it in place.

Figure 16:
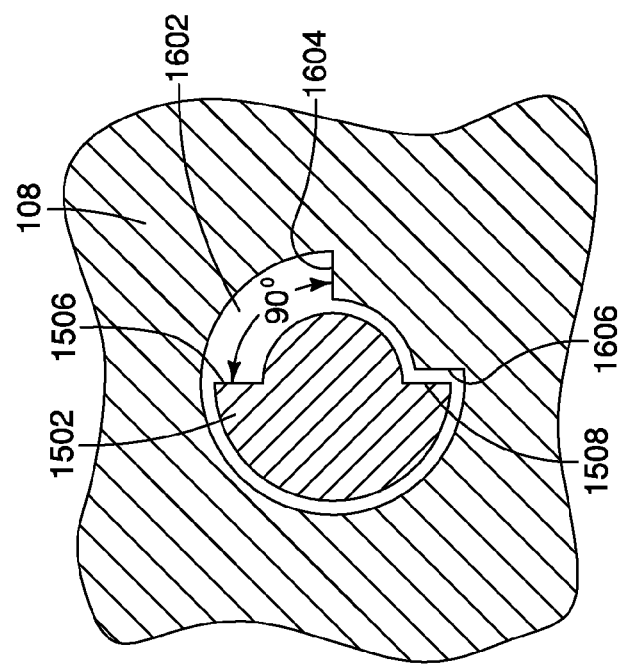
FIG. 16 is a top view of the shaft of the implementation of FIG. 15.

FIGS. 15 and 16 illustrate the shape of the shaft 1502 and the base portion 108. The shaft 1502 may include a first notch 1506 and a second notch 1508. The base portion 108 defines an opening 1602 that houses at least a portion of the shaft 1502. The opening 1602 is formed to include a first wall surface 1604 and a second wall surface 1606. The notches 1506 and 1508 and the wall surfaces 1604 and 1606 may be dimensioned and positioned to limit an amount of rotational movement of the shaft 1502 and the second keyboard portion 106 relative to the base portion 108. The first notch 1506 is dimensioned to abut the first wall surface 1604 and stop further rotational movement of the second keyboard portion 106 relative to the base portion 108 in a first direction. The second notch 1508 is dimensioned to abut the second wall surface 1606 and stop further rotational movement of the second keyboard portion 106 relative to the base portion 108 in a second direction. In the implementation of FIG. 16, the notch shape of the shaft 1502 and the shape of the opening 1602 that houses the shaft 1502 limits the angular movement of the shaft 1502 and the second keyboard portion 106 to about 90 degrees.

Figure 17:
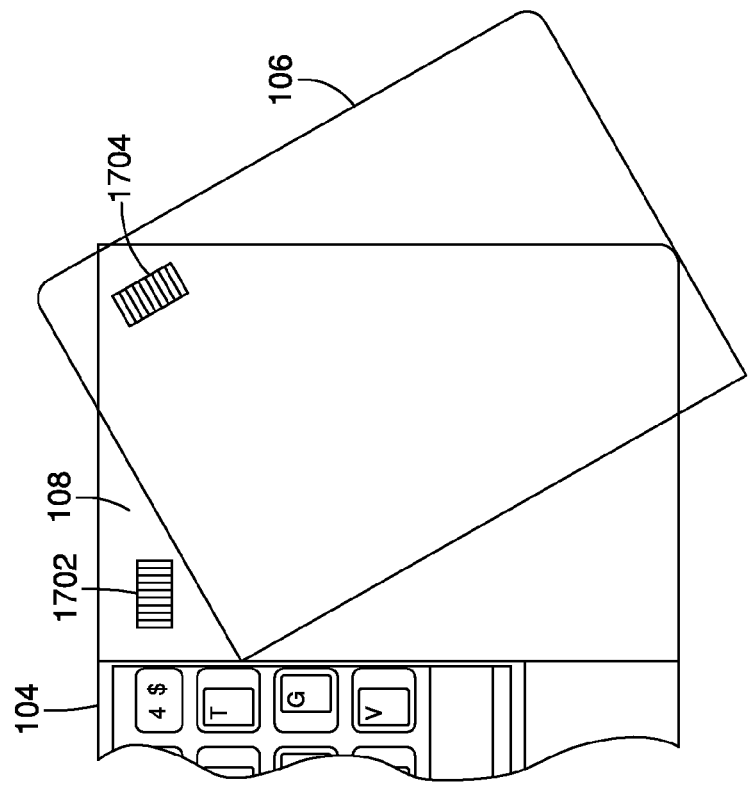
FIG. 17 shows a keyboard activation switch.

FIG. 17 shows a keyboard activation switch for the keyboard 102. In one implementation, the keyboard activation switch may comprise an electrical contact area 1702 formed on a surface of the base portion 108 and a corresponding electrical contact area 1704 formed on a surface of the second keyboard portion 106. The keyboard activation switch may be used to turn the keyboard 102 on or off. For example, the keyboard activation switch may be used to activate wireless communication, such as a Bluetooth link, for the keyboard 102 to connect with an electronic device. The keyboard activation switch may be designed so that the switch is triggered (e.g., it activates the keyboard 102) when the second keyboard portion 106 is positioned in the second orientation (of FIG. 2) but not when the second keyboard portion 106 is positioned in the first orientation (of FIG. 1). In the implementation of FIG. 17, the electrical contact areas 1702 and 1704 are sized and positioned so that they make electrical contact when the second keyboard portion 106 is in the second orientation but not when the second keyboard portion 106 is in the first orientation.

In some keyboard implementations, one of the keyboard portions 104 and 106 of FIGS. 1 and 2 may be designed for a rotational/articulating movement, while the other one of the keyboard portions 104 and 106 may remain in a fixed position. In other keyboard implementations, both of the keyboard portions 104 and 106 may be designed for a rotational/articulating movement. The rotational/articulating movements of the keyboard portions 104 and 106 may be in a generally clockwise direction or a generally counterclockwise direction.

While various embodiments of the present keyboard have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A keyboard, comprising:
   a base portion;
   a first keyboard portion coupled with the base portion and comprising a first edge and a first plurality of keys, where the first keyboard portion is held in a fixed orientation relative to the base portion;
   a second keyboard portion comprising a first edge, a second edge, and a second plurality of keys; and
   a connection component that couples the second keyboard portion with the base portion and allows a movement of the second keyboard portion, relative to the base portion and the first keyboard portion, between a closed storage orientation and an open operational orientation;
   where the first edge of the second keyboard portion is adjacent to the first edge of the first keyboard portion when the second keyboard portion is positioned in the closed storage orientation, where the second edge of the second keyboard portion is adjacent to the first edge of the first keyboard portion when the second keyboard portion is positioned in the open operational orientation, and where the keyboard has a longer length dimension when the second keyboard portion is positioned in the open operational orientation than when the second keyboard portion is positioned in the closed storage orientation;
   where the base portion comprises a frame, where the connection component comprises a first pivot socket and a second pivot socket, where the first pivot socket connects a corner portion of the second keyboard portion with a corner portion of the first keyboard portion, where the second pivot socket connects the second keyboard portion with the frame;
   where the second keyboard portion rotates about an axis line passing through the first pivot socket and the second pivot socket when the second keyboard portion transitions between the closed storage orientation and the open operational orientation; and
   where the second plurality of keys of the second keyboard portion face an opposite direction than the first plurality of keys of the first keyboard portion when the second keyboard portion is in the closed storage orientation, and where the second plurality of keys of the second keyboard portion face a same direction as the first plurality of keys of the first keyboard portion when the second keyboard portion is in the open operational orientation.

2. The keyboard of claim 1, where the second plurality of keys comprises a larger number of keys than the first plurality of keys.

3. The keyboard of claim 1, where the second keyboard portion has a larger surface area than the first keyboard portion.

4. The keyboard of claim 1, where the first edge of the second keyboard portion is longer than the second edge of the second keyboard portion.

5. The keyboard of claim 1, where the first keyboard portion comprises a first sub-portion of a QWERTY keyboard associated with a mobile electronic device, and where the second keyboard portion comprises a second sub-portion of the QWERTY keyboard.

6. The keyboard of claim 5, where the QWERTY keyboard comprises a "G" key and an "H" key, where the "G" key is part of the first keyboard portion and the "H" key is part of the second keyboard portion, and where the "H" key is positioned adjacent to the "G" key when the second keyboard portion is positioned in the open operational orientation but not when the second keyboard portion is positioned in the closed storage orientation.

7. The keyboard of claim 1, where the first keyboard portion is substantially coplanar with the second keyboard portion when the second keyboard portion is positioned in the closed storage orientation and when the second keyboard portion is positioned in the open operational orientation.

8. The keyboard of claim 1, further comprising a keyboard activation switch, where the keyboard activation switch is triggered when the second keyboard portion is positioned in the open operational orientation but not when the second keyboard portion is positioned in the closed storage orientation.

* * * * *